United States Patent [19]

Ratcliff

[11] Patent Number: 5,005,006
[45] Date of Patent: Apr. 2, 1991

[54] ELECTRONIC CONTROL FOR A FLUID SYSTEM

[76] Inventor: Kenneth W. Ratcliff, 21035 Lantz, Mt. Clemens, Mich. 48043

[21] Appl. No.: 461,565

[22] Filed: Jan. 5, 1990

[51] Int. Cl.$^5$ .............................................. G08B 21/00
[52] U.S. Cl. ................................. 340/611; 73/861.43; 73/861.47; 137/557
[58] Field of Search ............................. 340/611, 544; 73/861.42, 861.47; 137/84, 552, 555, 557; 364/510

[56] References Cited

U.S. PATENT DOCUMENTS

| | | | |
|---|---|---|---|
| 2,790,163 | 4/1957 | Armstrong et al. | 340/611 |
| 3,720,182 | 3/1973 | Harrah | 137/557 |
| 4,156,864 | 5/1979 | Ingram | 340/611 |

FOREIGN PATENT DOCUMENTS 2848358  5/1979  Fed. Rep. of Germany ...... 137/557

Primary Examiner—Joseph A. Orsino
Assistant Examiner—Jill Jackson
Attorney, Agent, or Firm—David L. Kuhn; Peter A. Taucher

[57] ABSTRACT

The invention is an electronic monitor for monitoring the pressure of in fluid circuitry and governing the shutdown in such mechanisms as dynamometers. The monitor has two pressure switches at every point in the fluid circuitry where pressure is sampled, and has a monitor circuit responding to signals from the switches to selectively energize lights indicating the status of the fluid circuitry. The monitor has a circuit for shutting down the dynamometers and other equipment when pressure falls below a predetermined threshold at one of the pressure monitoring points. The monitor also has a circuit for detecting which of the points is first to experience a fall in pressure below the threshold when the fluid circuitry as a whole is losing pressure.

9 Claims, 4 Drawing Sheets

ELECTRONIC CONTROL FOR A FLUID SYSTEM

GOVERNMENT INTEREST

The invention described herein may be manufactured, used and licensed by or for the U.S. Government for governmental purposes without payment to me of any royalty thereon.

BACKGROUND AND SUMMARY

The invention herein relates to electronic controls for monitoring pressures at various points in fluid circuitry for heavy, often specially constructed machinery such as multi-ton presses, engines for ocean-going cargo vessels or dynamometer assemblies for testing vehicle engines. In many instances, the machinery is integrated into the building or vessel where it is located. For example, a dynamometer assembly is known which has a dynamometer unit and associated gear boxes in the basement of a specially designed building to house the assembly, has a vehicle test stand located on the ground floor of the building, and has control rooms or like facilities located on a second floor or a mezzanine overlooking the test stand.

At least in the case of dynamometer assemblies, the heavy, specially constructed machinery represents an investment of hundreds of thousands or even millions of dollars. Failure to maintain pressure of coolants or liquid lubricants in the machinery could lead to expensive repairs or down time. If the machinery is integral to a building or vessel, the cost of removing major components or subassemblies and subsequently reinstalling them could be prohibitive. Consequently, it is logical for the pressure monitoring circuits to have some kind of redundancy to reduce the chance that a circuit failure will permit a fluid pressure failure to go unnoticed. One known form of redundancy is to have two pressure responsive switches at each point where pressure is monitored, one of the switches actuating when pressure drops to within a first pressure range and the other of the switches actuating in a second, lower pressure range.

Applicant's pressure controlling device is of the same general type as has been discussed above. Applicant's device has pairs of pressure responsive switches at various locations in fluid circuits of heavy machinery, and these switches send signals or responses to a monitoring circuit. Applicant's monitoring circuit reacts to the signals by selectively energizing or de-energizing indicator lights, by selectively outputting warning signals and by producing signals to initiate shutdown of part or all of the machinery. Applicant's monitoring circuit utilizes a novel, streamlined logic that reduces the amount of electrical power consumed by the circuit and speeds the operation of the circuit. In addition, applicant's circuit includes logic to indicate which of several low-pressure warning lights illuminates first. This logic is useful when monitoring several points in a fluid circuit which are communicated to one another. A pressure drop at one point in such a circuit is followed by pressure losses at the other points. Knowing which point experienced pressure failure first is often helpful in diagnosing the problem leading to the pressure failure.

DETAILED DESCRIPTION

Figure 1:
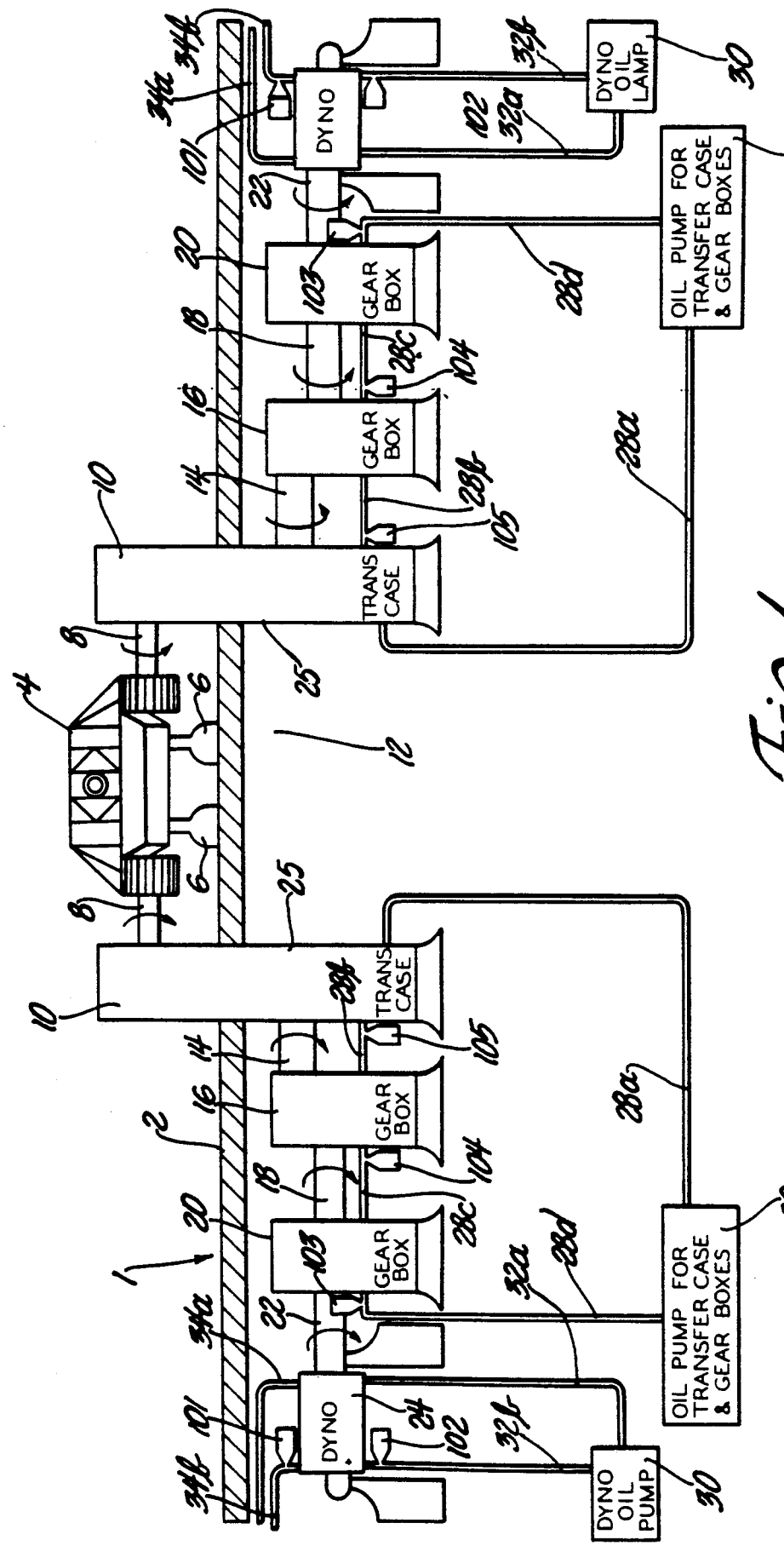
FIG. 1 is a semi-schematic view of a dynamometer assembly.

In FIG. 1, dynamometer assembly 1 includes a floor 2 upon which a tank 4 or other military vehicle is supported by jacks 6. The tank has a pair of final drives, each being operatively connected to one of output shafts 8. Output shafts 8 drive gears in transfer cases 10 which protrude through floor 2 from basement area 12 of the dynamometer assembly. Transfer shafts 14 transmit rotary power from transfer cases 10 to first gear boxes 16 and interbox shafts 18 transmit rotary power from first gear boxes 16 to second gear boxes 20. Final transfer shafts 22 transmit rotary power from second gear boxes 20 to dynamometers 24, which have means for absorbing and measuring the power output transferred to them from the tanks final drive.

The dynamometer assembly includes a pair of first oil pumps 26 servicing their respective transfer cases 10, first gear boxes 16 and second gear boxes 20. First oil pumps 26, transfer cases 10, first gear boxes 16 and second gear boxes 20 are fluidically communicated with each other by means of oil line segments 28a, 28b, 28c, and 28d. Second oil pumps 30 provide oil under pressure to dynamometers 24 and are connected to the dynamometers by oil lines 32a and 32b. Dynamometers 24 are cooled by water from inlet lines 34a and discharge the water through outlet lines 34b. The water lines and various oil lines have pressure switch assemblies 101, 102, 103, 104 and 105, each of which has a set of two pressure responsive switches. One switch closes when pressure falls below a first threshold level, say 8 psi, and the second switch closes when pressure falls below a second, lower threshold level, say 5 psi. In other words, the one switch actuates in a first pressure range (0 to 8 psi) and the second switch actuates in a second pressure range (0 to 5 psi).

Figure 2A:
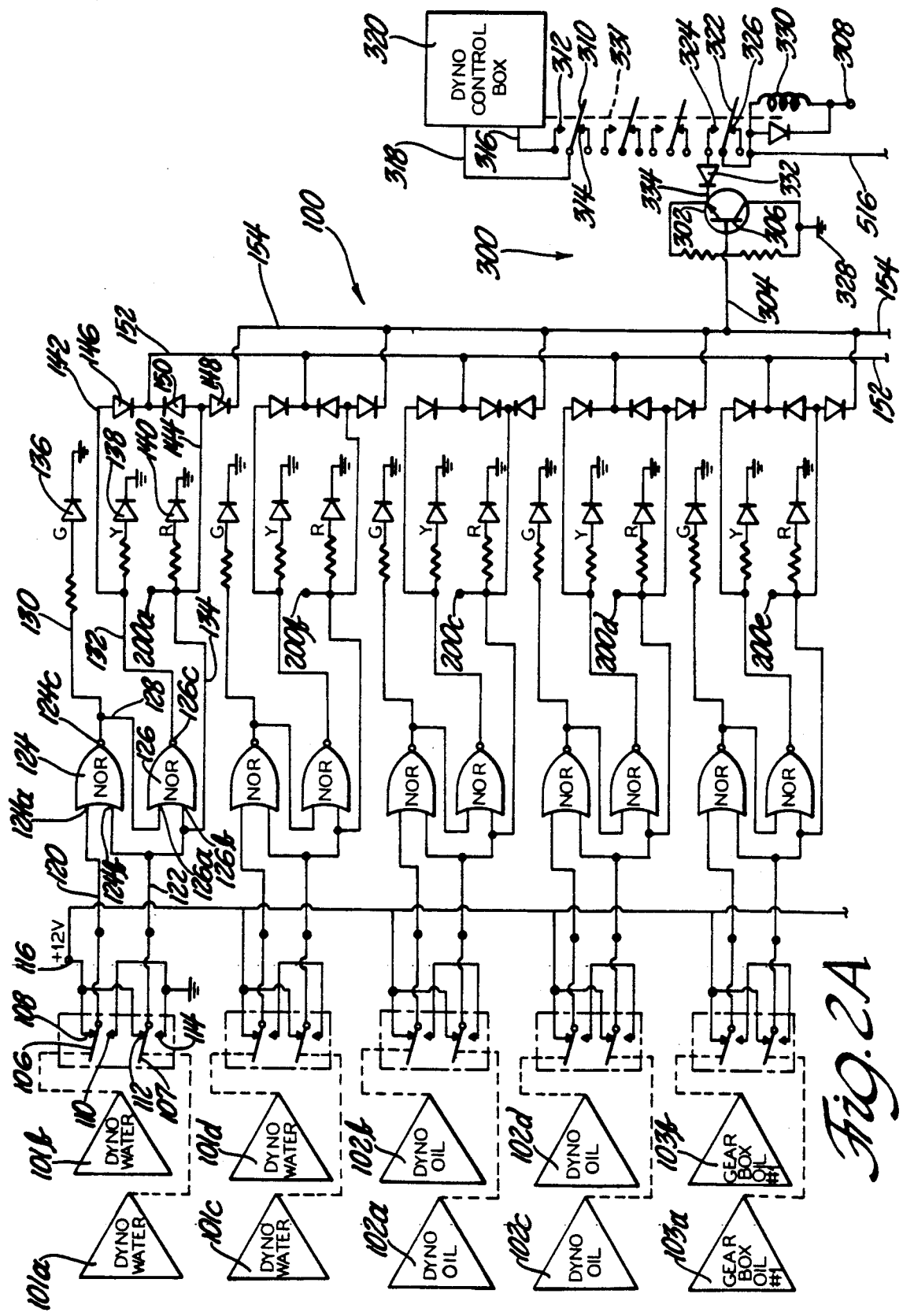
FIGS. 2A and B are schematic diagrams of a monitoring circuit for energizing or de-energizing various lights in response to fluid pressure at various points in the fluid circuitry of the dynamometer assembly.
Figure 2B:
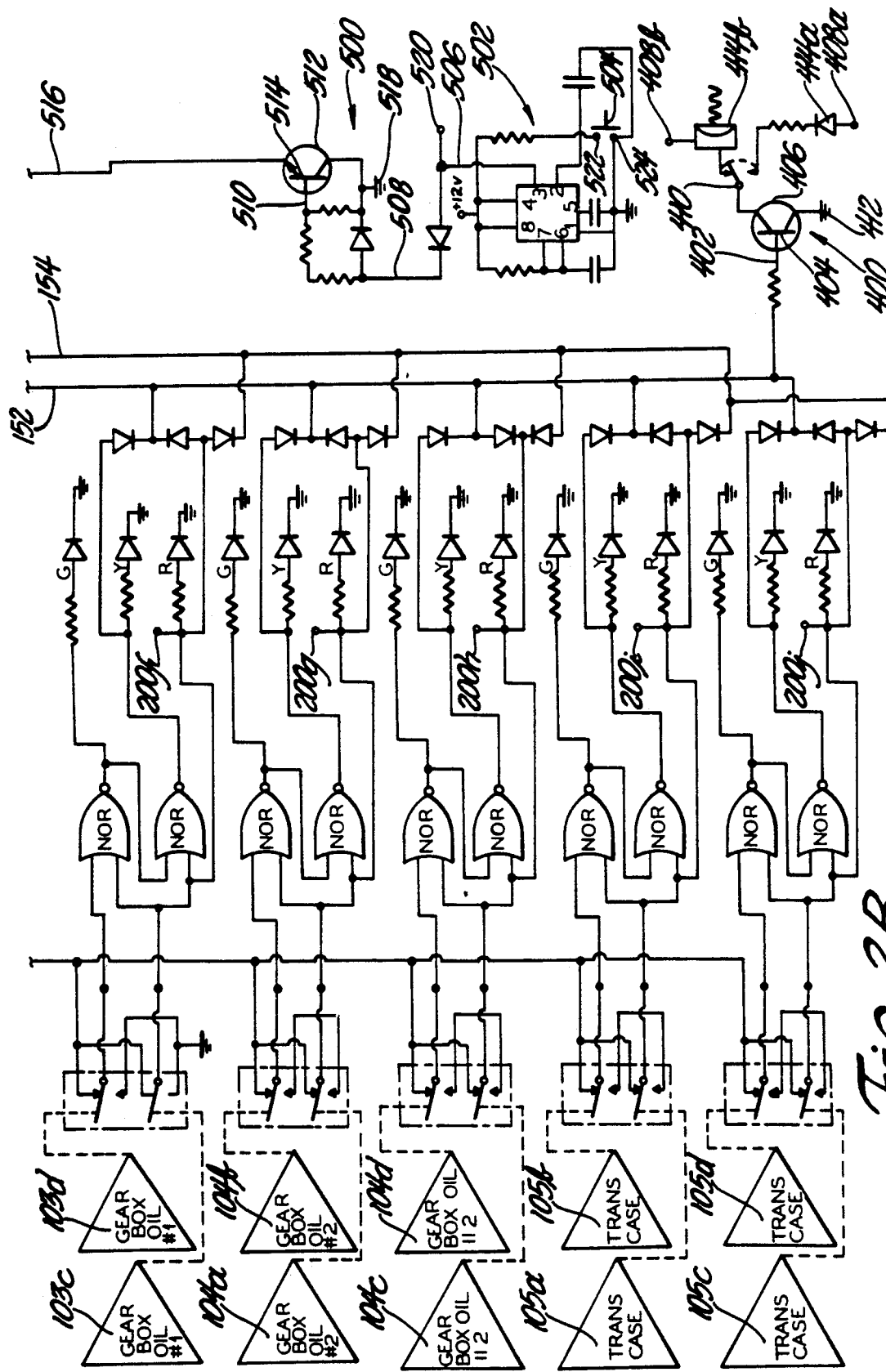

FIG. 2 shows part of the monitoring circuit 100 of which switch assemblies 101, 102, 103, 104, and 105 are part. Switches 101a and 101b are part of the left side dynamometer water switch assembly 101 in FIG. 1 and switches 101c and 101d are part of the right side dynamometer water switch assembly 101 in FIG. 1. Switches 102a and 102b are part of the left side dynamometer oil switch assembly 102 and switches 102c and 102d are part of the right side dynamometer oil switch assembly 102. Switches 103a and 103b are part of the left side first gear box oil switch assembly 103 and switches 103c and 103d are part of the right side first gear box oil switch assembly 103. Switches 104a and 104b are part of the left side second gear box switch assembly 104 and switches 104c and 104d are part of the right side second gear box switch assembly 104. Switches 105a and 105b are part of the left side transfer case switch assembly 105 and switches 105c and 105d are part of the right side transfer case switch assembly 105.

For each pair of switches in a given switch assembly, there is a logic circuit which selectively illuminates a set of lights in response to actuation of these switches. The logic circuit for one particular pair of switches, 101a and 101b will now be described with reference to FIG.

2, it being understood that the logic circuits for other pairs of switches will be the same.

Switch 101b closes when the pressure in the left side dynamometer water lines falls below a first predetermined threshold and switch 101a closes when this pressure falls below a second, lower threshold. Switch 101b includes a switch element 106 which engages contact 108 to close switch 101b when pressure is at or below the first threshold pressure. When switch 101b is open, switch element 108 is disengaged from contact 108 and normally will engage contact 110. Switch 101a likewise includes a switch element 107 which engages contact 112 to close switch 101a when pressure is at or below the second threshold pressure. When switch 101a is open, switch element 107 is disengaged from contact 112 and normally will engage contact 114.

If switch 101b closes, power from 12 volt source 116 can pass through line 120 to input 124a of NOR gate 124. If switch 101a closes, power from source 116 can pass through line 122 both to input 124b of NOR gate 124 and input 126b of NOR gate 126. Power from line 122 will also pass through line 134 to terminus 200a and red light 140. Power from line 122 will also pass into line 144, through diodes 148 and 150 and finally to alarm circuit 400 and shut-down circuit 300 through respective lines 152 and 154. The output 124c of NOR gate 124 communicates with green light 136 and with input 126a of NOR gate 126. The output 126c of NOR gate 126 communicates with yellow light 138.

When water pressure at the left side dynamometer 24 is above the higher predetermined threshold, both switches 101a and 101b are open, whereby lines 120 and 122 carry a low signal and both inputs of NOR gate 124 receive a zero or low signal. NOR gate responds to the two low signals by sending power (or a "high" signal) from output 124c through line 130 to illuminate green light 136. NOR gate 126 receives a high signal from output 124c and since NOR gate 126 now has at least one high input, NOR gate output 126c sends a low signal to yellow light 138, which remains unlit.

When water pressure at the left side dynamometer 24 is below the higher predetermined pressure threshold but above the lower predetermined pressure threshold, then switch 101b closes while switch 101a remains open. As a result, NOR gate 124 receives a high signal at input 124a and outputs no current to green light 136, which now remains unlit. NOR gate 126 receives low signals at both inputs 126a and 126b so that NOR gate output 126c sends current to illuminate yellow light 138.

When water pressure at the left side dynamometer 24 falls below the lower predetermined threshold pressure, both switch 101a and switch 101b are closed. Both inputs of NOR gate 124 receive high signals and NOR gate 124 outputs a low signal to NOR gate input 126a and also does not illuminate green light 136. NOR gate 126 receives a high signal at input 126b and therefore sends no current to yellow light 138 from output 126c, so that the yellow light will be unlit. Power in line 122 passes through line 134 to illuminate red light 140.

It can be seen from FIG. 2 that when current from line 132 illuminates yellow light 138, current from line 132 will also pass through lines 142, 152 and 154 to energize alarm circuit 400. It can also be seen from FIG. 2 that when current from line 134 illuminates red light 140, current from line 134 will also send power to terminus 200a, and through line 144 to lines 152 and 154 so as to energize alarm circuit 400 and shut-down circuit 300. It will further be seen from FIG. 2 that each of switch assemblies 102, 103, 104 and 105 have the same NOR gate type of logic circuit that has been described for the left side switch assembly 101. Thus, when fluid pressure at each switch assembly is above the higher threshold, a green light will be illuminated for each switch assembly. For any switch assembly where the pressure falls below the higher threshold level but remains above the lower threshold level, a yellow light associated with that switch assembly will illuminate, the associated green light will go out, and an alarm will activate. For any switch assembly where the pressure falls below the lower threshold, a red light associated with that switch assembly will illuminate, the associated green and yellow lights will go out, an alarm will be activated and shut-down circuit 300 will be energized.

Shut down circuit 300 includes a switch element 310 biased mechanically toward an electrical terminal 314 and away from electrical terminal 312. When switch element 310 disengages from terminal 312, a safety circuit including line 316, line 318 and dynamometer control box 320 is broken and this results in dynamometer assembly 24 being shut down. Shut down circuit 300 also includes a switch element 322 biased mechanically toward electrical terminal 326 and away from electrical terminal 324. Switch element 322 is part of an electrical path from 12 volt power source 308, through coil 330, through switch element 322, terminal 324, diode 332, transistor 302 and thence to ground 328. When this electrical path is completed, coil 330 is energized so as to actuate a translatable core or other electrically controlled means connected to switch elements 310 and 322, the core being represented by dashed line 331. When coil 322 is energized, this core overcomes the mechanical bias on switch elements 310 and 322 so as to simultaneously close these switch elements against respective terminals 312 and 324. As a result, the aforementioned safety circuit remains unbroken so that the safety circuit does not interrupt operation of the dynamometer assembly and the electrical current can follow a path from voltage source 308 through coil 330 to ground 328 so that coil 230 can remain energized.

As noted previously, when any of the switch assemblies 101 through 105 detects that fluid pressure has fallen below the lower threshold, line 154 will be electrically energized. Base 306 of transistor 302 will then be energized by line 304, which connects line 154 to base 306. Once base 306 is energized, then current can not flow from line segment 334 across transistor 302 to ground 308, whereby current can not flow through coil 330 and the coil will no longer overcome the mechanical bias on switch elements 310 and 322. As a consequence, switch element 310 disengages from terminal 312 and closes with terminal 314 so that the safety circuit is open. As another consequence, switch element 322 disengages from terminal 324 so that coil 330 is de-energized and will remain de-energized until it is grounded through reset circuit 500. The coil will remain de-energized even if base 302 subsequently ceases to receive power through line 304, unless reset circuit first re-energizes coil 330.

Reset circuit 500 is used to temporarily defeat shut down circuit 300 when dynamometer assembly 24 starts up so that the various fluids in the dynamometer assembly have time to go from essentially zero, rest pressure to operating pressure during the start up procedure. Reset circuit 500 includes timer circuit 502, which has a push button switch 504 which can be actuated to make momentary contact between terminals 522 and 524.

After this momentary contact occurs, timer circuit 500 will send current for a predetermined time period through lines 506, 508 and 510 to base 514 of transistor 512. Base 514 is energized and permits current to flow from terminal 326 through line 516 to ground 518, whereby coil 330 energizes and moves armature 331 so as to move switch elements 310 and 322. Consequently, the safety circuit is closed and the electrical path between coil 330 and transistor 302 is complete. If base 306 ceases to receive power from line 304 during the predetermined time period, coil 330 remains energized even after timer circuit 502 stops sending power to base 514 and the connection between coil 330 and ground 518 is broken. It will be noted that whenever timer circuit 500 is sending power to base 514 of transistor 512, the timer circuit is simultaneously sending power to terminal 520, which connects to a detection circuit 202 shown in FIG. 3.

Alarm circuit 400 is connected to line 152 by line segment 402 so that when one of switch assemblies 101 through 105 detects a pressure at or below the threshold levels, base 404 of alarm transistor 406 will be energized. As a result, power from one of 12 volt power sources 408a or 408b flows through switch 110 to ground 412. Depending on the position of switch 410, either visual alarm means 414a or audio alarm means 414b will be activated.

Figure 3:
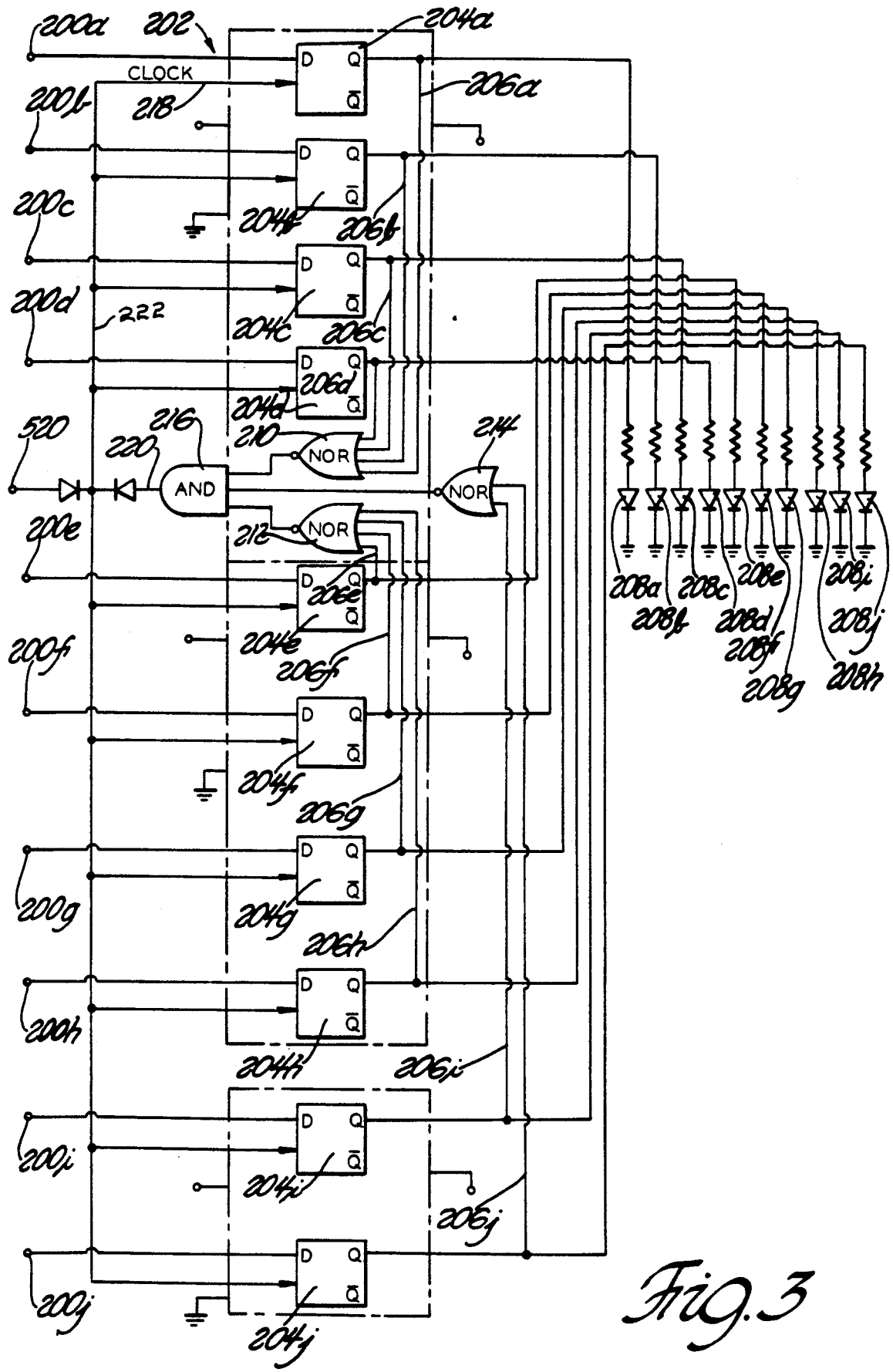
FIG. 3 is a schematic diagram of a detection circuit for indicating which of several low pressure warning lights is the first to illuminate.

Shown in FIG. 3 is detection circuit 202, whose purpose is to record which of terminals 200a through 200j (FIG. 2) is energized first. Circuit 202 thereby records which of switch assemblies 101 through 105 is the first to detect a "red light" condition where fluid pressure is at or below the lower threshold pressure. The principle components of circuit 202 are: D-latches 204a through 204j; NOR gates 210, 212 and 214; AND gate 216; and light emitting diodes 208a through 208j.

An explanation of the operation of circuit 202 will begin with a description of how D-latch 204a operates, it being understood that D-latches 204b through 204j operates in the same fashion as D-latch 204a. Input D of D-latch 204a receives a signal from terminal 200a, which is de-energized (and sends a "zero" signal) when pressure at the left side dynamometer switch assembly is above the lower threshold level. Conversely, terminal 200a will be energized and will send a "high" signal to input D when pressure at the left side dynamometer switch assembly is at or below the lower threshold level. D-latch 204a also gets a signal from clock input line 218. As long as clock input line is energized and sends a high signal to D-latch 204a, D-latch 204a will pass to output Q whatever signal it receives at input D, so that a high signal to input D results in high signal from output Q and a low signal to input D results in a low signal from output Q. Whenever clock input line 218 is de-energized and sends a low signal to D-latch 204a, then D-latch 204a "latches" and output Q thereafter continues to send whatever signal (high or low) it was sending at the time of latching, despite any subsequent signal change from terminal 200a. D-latch 204a remains latched as long as it receives a low signal from clock input line 218.

Under normal operating conditions of dynamometer assembly 24, all fluid pressures are above the lower threshold levels so that all the terminals 200a through 200j send low signals to respective D-latches 204a through 204j. Each of the D-latches will respond by sending a low signal to the appropriate NOR gate, 210, 212 or 214. Since all of the inputs to the NOR gates are low signals, the NOR gates will all send high signals to AND gate 216. The AND gate responds by sending a high signal to clock bus line 222 through AND gate output line 220. Bus line then sends the high signal to all the D-latches through clock input lines such as that shown at 218. D-latches 204a through 204j are thus maintained in an unlatched condition and will continue to pass whatever signals they receive from respective terminals 200a through 200j.

If one of the appropriate switches in monitoring circuit 100, say dynamometer water switch 101a, detects a pressure at or below the lower threshold pressure, then input D of the appropriate D-latch (in this case, D-latch 204a) passes a high signal to the appropriate light emitting diode. The high signal is sent to the input of the appropriate NOR gate, which is NOR gate 210 in this instance. The NOR gate responds by sending a low signal to AND gate 216 which is programmed to send a low (zero volts) signal to output line 220 whenever it receives a low signal from one or more of the NOR gates. Bus line 222 is then de-energized, assuming that no power is coming through terminal 520 of reset circuit 500. All of the D-latches will thus receive a low signal from their respective clock input lines and will latch. Latch 204a will maintain a high signal from its Q output and the remaining D-latches will continue to have low signals at their Q outputs, no matter if there are any changes in signals from terminals 200a through 200j to the respective D-latches. D-latch 204a will continue to illuminate light emitting diode 208a and the remaining light emitting diodes will receive no power from their respective D-latches. Consequently, by observing which of light emitting diodes 208a through 208j is lit, one can determine which one of switch assemblies was first to detect a pressure at or below the lower threshold pressure.

When reset circuit 500 is actuated to temporarily defeat shut-down circuit 300, the reset circuit also sends current to terminal 520 shown in FIGS. 2 and 3. Current from terminal 520 enters clock bus 222, whereby D-latches 204a through 204j are maintained in an unlatched condition during the predetermined time interval when the reset circuit operates. This allows fluids in the dynamometer assembly to go from a rest pressure to operating pressure during start up of the dynamometer assembly.

I wish it to be understood that I do not desire to be limited to the exact details of construction shown and described since obvious modifications will occur to those skilled in the relevant arts without departing from the spirit and scope of the following claims.

I claim:

1. An electronic device for monitoring pressure in a system of fluid circuitry in a machine, the fluid circuitry having at least one location where fluid pressure is monitored, the electronic device comprising:
a set of at least two switches at the location, one of the switches actuated when pressure at the location is within a first range, another of the switches actuated when pressure at the location is within a second range, the set being capable of giving four responses, wherein the one switch gives a first response when not actuated and gives a second response when actuated, and wherein the other switch gives a third response when not actuated and gives a fourth response when actuated;
a first NOR gate receiving the responses from the switches, the first NOR gate outputting a fifth response when receiving both the first response from the one switch and the third response from the other switch, the first NOR gate outputting a sixth response when receiving either a second response from the one switch or the fourth response from the other switch;

a first indicator means for indicating a first status of the fluid pressure at the location, the first indicating means being actuated in response to the fifth response from the first NOR gate;

a second NOR gate, the second NOR gate receiving the third and fourth responses from the other switch and receiving the fifth and sixth responses from the first NOR gate, the second NOR gate outputting a seventh response when receiving both the third response from the other switch and the sixth response from the first NOR gate, the second NOR gate outputting an eighth response when receiving either the fourth response from the other switch or the fifth response from the first NOR gate;

a second indicator means for indicating a second status of the pressure at the location, the second indicator means actuated in response to the seventh response from the second NOR gate;

a third indicator means for indicating a third status of the fluid pressure at the location, the third indicator means actuated in response to the fourth response of the other switch;

whereby pressure at the location outside both the first range and the second range results in actuation of neither the one nor the other switch, so that the one switch sends the first response while the other switch sends the third response, so that the first indicator means is actuated to show that the pressure at the location is outside both the first range and the second range;

whereby pressure at the location within the first range and outside the second range results in actuation of the one switch but not the other switch, so that the second response is given by the one switch and the third response is given by the other switch, so that the second indicator means is actuated to show that the pressure at the location is within the first range and outside the second range; and whereby pressure at the location within the second range results in actuation of both the one switch and the other switch, so that the one switch gives the second response and the other switch gives the fourth response, so that the third indicator means is actuated to show that pressure at the location is within the second range.

2. The device of claim 1 wherein no more than one of the indicator means is actuated at any given time.

3. The device of claim 1 wherein:
the fluid circuit has a plurality of locations where fluid pressure is monitored;
each location has its own set of switches;
at least two of the locations are in fluid communication with one another;
the other switch in each set is capable of giving the fourth response;
the mechanism has a detection circuit for indicating which of the other switches is the first to give the fourth response.

4. The device of claim 3 wherein the detection circuit comprises:

an output circuit element for each of the other switches, each of the circuit elements being in series with a respective one of the other switches, the circuit elements sending a first output signal when receiving the fourth response from the other switches and sending a second output signal when receiving the third response from the other switches;

a feedback means for receiving the output signals from the circuit elements and sending a third signal back to the circuit elements whenever the feedback means receives the first output signal, the third signal disabling the circuit elements from changing the output signals whereby the first of the other switches to send the fourth response causes (a) the output circuit element associated with the first other switch to send the first output signal to the feedback circuit and the fourth response further causes (b) the feedback circuit to disable all of the output circuit elements from changing their output signals, whereby only the output circuit element associated with the first other switch sends the first output signal, thereby distinguishing the first other switch from a set of the other switches.

5. The device of claim 4 wherein:
the device includes a controller reacting to the fourth response;
the controller has a safety circuit for stopping operation of a machine, the safety circuit having a interruption switch mechanically biased toward the open position at which the machine will be stopped;
the controller includes a shut down circuit having an electrical coil and a core translatable in the coil, the core mechanically connected to the interruption switch so that energization of the coil moves the interruption switch from the open position to a closed position at which the machine will operate;
the coil is part of an electrical path from a power source to ground, the electrical path including a shut down switch mechanically biased to the open position to break the continuity of the electrical path, the shut down switch being in series with the coil and being mechanically connected to the core so that energization of the coil moves the shut down switch from the open position to a closed position where the shut down switch no longer breaks the continuity of the electrical path, whereby de-energization of the coil permits the shut down switch to move to the open position;
the electrical path includes a means in series with the shut down switch for preventing the flow of current in the path, the preventing means reacting to the fourth response from any of the other switches to prevent the flow of current in the electrical path, the preventing means ceasing to interrupt the flow of current in the electrical path in response to an absence of the fourth signal from any of the other switches;
whereby the fourth response actuates the preventing means of the controller and thereby ultimately causes the interruption switch to open and the machine to stop, and whereby subsequent deactivation of the preventing means permits closure of the interruption switch by closure of the shut down switch, whereby deactivation of the preventing means permits restart of the machine.

6. The device of claim 5 further including a reset circuit having an alternate electrical current pathway through the coil to ground, the alternate pathway bypassing the shut down switch, the reset circuit further including a means to send a fourth signal to the output circuit elements to insure that the circuit elements are enabled to change output signals.

7. A monitor for a system of fluid circuitry, wherein the fluid circuitry has a location where fluid pressure is monitored, comprising:

a set of switches at the location, the set being capable of giving four responses, one of the switches actuated when pressure at the location is within a first range, another of the switches actuated when pressure at the location is within a second range, the one switch giving a first response when not actuated and giving a second response when actuated, the other switch giving a third response when not actuated and giving a fourth response when actuated;

a first indicator actuatable to show that the fluid pressure at the location is outside the first and second ranges;

a second indicator actuatable to show that the fluid pressure at the location is within the first range;

a third indicator actuatable to show that the fluid pressure at the location is within the second range;

a monitor circuit receiving the responses from the one switch and the other switch wherein the monitor circuit actuates the first indicator when receiving the first and third responses, whereby the first indicator shows that the fluid pressure at the location is outside the first and second ranges;

wherein the monitor circuit actuates the second indicator when receiving the second and third responses, whereby the second indicator shows that the fluid pressure at the location is within the first range;

and whereby the monitor circuit actuates the third indicator when receiving the fourth response, whereby the third indicator shows that the fluid pressure at the location is within the second range.

8. The monitor of claim 7 wherein:

the fluid circuitry has a plurality of locations where fluid pressure is monitored;

each location has its own set of switches;

at least two of the locations are in fluid communication with one another;

the other switch in each set is capable of giving the fourth response;

the monitor circuit has a detection circuit means for indicating which of the other switches is the first to give the fourth response.

9. The monitor of claim 8 wherein the detection circuit means comprises:

an output circuit element for each of the other switches, each of the circuit elements being in series with a respective one of the other switches, the circuit elements sending a first output signal when receiving the fourth response from the other switches and sending a second output signal when receiving the third response from the other switches;

detection means associated with each circuit element for showing whether the circuit element is sending the first output signal;

a feedback means for receiving the output signals from the circuit elements and sending a third signal back to the circuit elements whenever the feedback means receives the first output signal, the third signal disabling the circuit elements from changing the output signals.

* * * * *